United States Patent Office 2,993,839
Patented July 25, 1961

2,993,839
PROCESS FOR THE PREPARATION OF
PREDNISOLONE
Kyosuke Tsuda, Urawa-shi, Saitama-ken, and Toshinobu Asai, Hiroshi Iizuka, Tokuji Tanaka, Michikazu Nakamura, Hiroshi Okazaki, Makoto Shirasaka, and Atsushi Naito, Tokyo, Japan, assignors to Sankyo Kabushiki Kaisha, Tokyo, Japan
No Drawing. Filed Dec. 4, 1959, Ser. No. 857,264
Claims priority, application Japan Dec. 8, 1958
4 Claims. (Cl. 195—51)

This invention relates to a process for the preparation of prednisolone ($\Delta^{1,4}$-pregnene-11$\beta$,17$\alpha$,21-triol-3,20-dione) by a single step fermentation method which comprises subjecting Reichstein's compound S ($\Delta^4$-pregnene-17$\alpha$,21-diol-3,20-dione) to the actions of enzymes produced by a microorganism *Helminthosporium sativum* and of those produced by a microorganism *Bacillus pulvifaciens* in sequence in one and the same fermentation vessel. Furthermore, this invention relates to a process for the preparation of hydrocortisone ($\Delta^4$-pregnene-11$\beta$,17$\alpha$,21-triol-3,20-dione) by subjecting Reichstein's compound S to the action of enzymes produced by a microorganism *Helminthosporium sativum* and also to a process for the preparation of prednisolone by subjecting hydrocortisone to the action of enzymes produced by a microorganism *Bacillus pulvifaciens*.

The term "single step fermentation" means that two separate fermentations using two sorts of microorganism are, in sequence, carried out in one and the same fermentation vessel.

It is recently known that the introduction of a hydroxyl substituent at 11-position of hydrocortisone, though being very hardly achieved by chemical synthesis, is very advantageously effected by the action of microorganisms. For the introduction of a hydroxyl substituent at 11-position of steroid moiety using microorganisms in the preparation of hydrocortisone many methods are known, such as those disclosed in U.S. Patents No. 2,789,940, No. 2,793,162, No. 2,793,163, No. 2,785,134 and No. 2,876,170. As a result of our studies for many years on the introduction of a hydroxyl substituent at 11-position of steroid by the use of microorganisms, we have found that Reichstein's compound S may be subjected to the action of enzymes produced by a microorganism *Helminthosporium sativum*, different from any of the microorganisms disclosed in the aforementioned U.S. patents and hitherto unutilized in microbiological transformation of steroids, to introduce a hydroxyl substituent to the 11-position leading to an advantageous preparation of hydrocortisone.

Further, it is known that the introduction of a double bond at 1-position of steroid moiety, which is a troublesome step in the chemical synthesis of prednisolone, is effected by the action of microorganisms in a very advantageous way. U.S. Patents No. 2,776,927, No. 2,793,164, No, 2,822,318, No. 2,876,171 and so forth have disclosed several processes for the introduction of a double bond at the 1-position of steroid moiety using microorganisms in the preparation of prednisolone. We have now found that prednisolone may be advantageously prepared by subjecting hydrocortisone to the action of enzymes produced by a microorganism *Bacillus pulvifaciens*, which is different from any of the microorganisms disclosed in the aforementioned U.S. patents and hitherto unutilized in microbiological transformation of steroids, for the introduction of a double bond at 1-position of the steroid moiety.

Moreover, we have discovered that prednisolone may be directly and readily prepared by a novel single step fermentation process which comprises subjecting Reichstein's compound S, in sequence, to the actions of enzymes produced by *Helminthosporium sativum* and *Bacillus pulvifaciens* in one and the same fermentation vessel.

It is generally necessary for the preparation of prednisolone from Reichstein's compound S by fermentation method to carry out the fermentation twice separately using two sorts of microorganisms. That is to say, firstly one of microorganisms is cultured in the first nutrient medium and Reichstein's compound S is then added to the cultured broth and is oxygenated to hydrocortisone which is isolated from the broth by extraction and purified; secondarily hydrocortisone thus obtained is added to the cultured broth resulted from the cultivation of another microorganism in second nutrient medium and to give prednisolone which is again isolated and purified.

In such a conventional method, as mentioned above, not only the fermentation followed by oxygenation but also the extraction and purification of oxygenated products are required to be carried out twice respectively. In general, however, extraction and isolation of a steroid compound formed in the fermentation broth is associated with troublesome operations as well as by very low yield of the purified product, such as purification yield usually below 50 percent owing to the presence of a large amount of impurities in the fermentation broth. Consequently, it follows that, even if the rate of oxygenation in each stage amounted to 100 percent, final yield of the product would be relatively low after the extraction, isolation and purification were put into effect twice respectively.

Accordingly, it would be favorable if the production and recovery of prednisolone in the fermentation process can be performed in a single isolation and purification operation. However, this would be possible only when the hydrocortisone formed in the first fermentation broth, without isolation from the said broth, could be effectively subjected to the oxygenating action of the second microorganism to produce prednisolone. Generally speaking, it is extremely difficult in the microbiological technique to grow a microorganism in the broth preincubated with the other different microorganism and therefore, such a process has hitherto never been practically applied. However, if the process is successfully brought into practice it is very advantageous from the industrial point of view since the possible continuous cultivation of two sorts of microorganism in one and the same fermentation vessel results in saving of nutrient medium and labor as well as in the increase of yield due to the elimination of the intermediate isolation and purification step.

It is a main object of this invention to provide a single step fermentation method for the industrial production of prednisolone from Reichstein's compound S by means of microorganisms, *Helminthosporium sativum* and *Bacillus pulvifaciens*. Other objects of this invention will be apparent from the statements hereinafter.

According to the present invention, the above objects of this invention may be achieved by subjecting Reichstein's compound S to the action of enzymes produced by *Helminthosporium sativum* and then, without isolating the intermediate 11$\beta$-oxygenated product thus obtained, subjecting the said fermentation broth to the action of enzymes produced by *Bacillus pulvifaciens*.

In preparing prednisolone from Reichstein's compound S in accordance with the process of this invention, said process may be carried out in the following way: The microorganism capable of introducing a hydroxyl substituent to 11$\beta$-position of steroid moiety, *Helminthosporium sativum*, is incubated under aerobic condition at about 25–27° C., preferably at about 28° C., in a suitable medium and to the resulting fermentation broth is added Reichstein's compound S followed by further continuation of the fermentation under aerobic condition for a suitable period to form hydrocortisone. The resulting fermentation broth, without isolation of the hydrocortisone formed and the mycelium involved therein, is heat-treated under a suitable condition, followed by cooling to about 28–37° C., preferably to about 30° C. Alternatively, it may be, without the heat-treatment above mentioned, adjusted to the aforementioned temperature. The resulting broth is then inoculated with the microorganism capable of dehydrogenating steroids at $C_1$-position, *Bacillus pulvifaciens* and cultivated under aerobic condition at about 28–37° C., preferably at about 30° C. for a suitable period to convert the hydrocortisone to prednisolone. The prednisolone thus obtained may be extracted by a conventional means with a suitable solvent, such as ethyl acetate, butyl acetate, chloroform, ethylene dichloride or the like, or it may be isolated by column-chromatography on magnesium silicate or silica gel.

As the nutrient medium utilized in the process according to the present invention is not needed any special medium, but various media well known to those skilled in the art may be employed. However, in practice, it is preferable to use glucose-peptone medium or glucose-corn steep liquor medium.

In carrying out the process according to the present invention, if the preparation of hydrocortisone is desired, the fermentation may be discontinued following the first stage and hydrocortisone may be isolated from the fermentation medium thus obtained by a conventional means, such as extraction with a suitable solvent as aforementioned or columnchromatography.

The following examples are given by way of illustration and are not to be considered as limitation of this invention, since many apparently widely different embodiments of the present invention may be made without departing from the spirit or scope hereof.

Example I 30 l. of an aqueous nutrient medium containing glucose 5%, peptone 2% and cornsteep liquor 0.5% and adjusted to pH 5.4 are placed in a stainless-steel tank of a volume of 50 l. and sterilized at 120° C. for 30 min. and then inoculated with 1.5 l. of a culture of *Helminthosporium sativum* cultivated with shaking for 3 days. The mixture is cultivated at about 28° C. with stirring at a rate of 200 r.p.m. and under aeration at a rate of 300 l. per min. for 24 hrs., followed by addition of 15 g. of Reichstein's compound S dissolved in 500 cc. of methanol. Stirring is continued for additional 48 hrs. The resulting fermentation broth is adjusted to pH 7.0 with an alkali, heat-treated at 100° C. for 30 min. and cooled to about 30° C. The resulting broth is then inoculated with 1.5 l. of a culture of *Bacillus pulvifaciens* cultivated with shaking for 24 hrs. Fermentation is carried out under the same conditions as above except that temperature is about 30° C. and period is 72 hrs. to form prednisolone. The resulting fermentation broth is divided into the mycelium and the filtrate, the former being extracted with acetone. The extract and the filtrate are combined and extracted with two portions of about 20 l. of ethyl acetate. The combined extracts are concentrated at below 40° C. to obtain about 18 g. of a dry matter. It is crystallized from acetone to obtain about 2.5 g. of prednisolone, M.P. 225–230° C., $[\alpha]_D+97°$ (in methanol). The mother liquor from the above crystallization is chromatographed on silica-gel column to recover about 1 g. of prednisolone. Yield: 3.5 g.

Example II 1000 ml. of potato decoct containing 3 g. of glucose and 0.5 g. of sodium glutamate, adjusted to pH 5.4, are placed in each of ten 500-ml. shaking flasks. Each of the ten flasks is inoculated with *Helminthosporium sativum*. The mixture is cultivated under shaking at about 27° C. for 72 hrs., after which 50 mg. of Reichstein's compound S (dissolved in 2 cc. of methanol) are added to each flask. Shaking is then continued for additional 24 hrs. Combined fermentation broth are concentrated in vacuo, followed by washing with two portions of 100 ml. of 2% aq. sodium bicarbonate and then with two portions of 100 ml. of water. The resulting concentrate is dried over sodium sulfate, further concentrated in vacuo and dried to give about 320 mg. of crude crystals.

The above crystals are dissolved in methylene chloride and the solution is applied to chromatography on 20 g. of silica gel mixed with 20 cc. of ethyl alcohol. From fractions eluted by methylene chloride containing 4% of ethyl alcohol 100 mg. of the oxygenated product, melting at 200° C. are obtained. This is recrystallized three times from methanol to obtain the purified product melting at 207.5–209° C. Mixed M.P. by admixture with authentic hydrocortisone (M.P. 207–208°) is not depressed. Infrared spectrum of the product is completely identical with that of authentic hydrocortisone.

Example III 1 l. of the medium used in Example II is placed in a 5-l. Erlenmeyer flask and the medium is inoculated with a culture of *Helminthosporium sativum* cultivated in a 500-ml. shaking flask containing 100 ml. of the aforementioned medium at about 27° C. for 72 hrs. The mixture is cultivated on a rotary shaker at about 30° C. for 24 hrs., after which are added 500 mg. of Reichstein's compound S dissolved in 20 cc. of methanol. Fermentation is continued for additional 24 hrs. The resulting fermentation broth is subjected to extraction and purification in the same way as in Example II to obtain hydrocortisone.

Example IV

A synthetic medium having the following composition is prepared and the pH is adjusted to 7.2:

|   | Percent |
|---|---|
| Glucose | 1 |
| Peptone | 1 |
| Meat extract | 1 |
| Sodium chloride | 0.3 |

60 ml. of the medium are placed in each of thirty-three 500-ml. flasks and sterilized under pressure of 15 lbs. per square inch for 15 min. After cooling, 1 ml. of a solution of 3 g. of hydrocortisone in 100 ml. of methanol is added to the flasks. Alternatively, 30 mg. of hydrocortisone finely pulverized in a motor are added to each of the flasks. *Bacillus pulvifaciens* is then inoculated and the mixture is cultivated with stirring at a rate at 120 r.p.m. for 84–96 hrs. Fermentation is completed at final pH of 8.4–8.6. The resulting fermentation mass is then extracted three times with ethyl acetate and the combined extracts are concentrated in vacuo to a volume of about 500 ml. The concentrate is washed twice with 2% aq. sodium bicarbonate and then twice with water, dried and concentrated to obtain an oily mass. The oily mass is allowed to stand to crystallize it. Recrystallization of the crystals from acetone gives crystals of prednisolone melting at 225–230° C.

What we claim is:—

1. A process for the preparation of prednisolone which comprises subjecting Reichstein's compound S to the action of enzymes produced by *Helminthosporium sativum* and then, without isolation of the intermediate steroid product formed, subjecting the fermentation broth to the action of enzymes produced by *Bacillus pulvifaciens* in one and the same fermentation vessel.

2. A process for the preparation of hydrocortisone which comprises subjecting Reichstein's compound S to the action of enzymes produced by a microorganism, *Helminthosporium sativum*.

3. A process for the preparation of prednisolone which comprises subjecting hydrocortisone to the action of enzymes produced by a microorganism *Bacillus pulvifaciens*.

4. A process for the preparation of prednisolone which comprises cultivating a microorganism *Helminthosporium sativum* in a liquid nutrient medium, adding Reichstein's compound S in said fermentation broth to convert said compound to hydrocortisone by enzymes formed in said fermentation, cultivating another microorganism *Bacillus pulvifaciens* in said hydrocortisone-containing-fermentation broth in one and the same fermentation vessel to convert hydrocortisone to prednisolone by enzymes produced by cultivation of *Bacillus pulvifaciens* and recovering the prednisolone from fermentation broth.

References Cited in the file of this patent

UNITED STATES PATENTS

| | | |
|---|---|---|
| 2,816,121 | Gould et al. | Dec. 10, 1957 |
| 2,831,798 | McAleer et al. | Apr. 22, 1958 |
| 2,844,513 | Wettstein et al. | July 22, 1958 |